Inventor
Albert W. Ondis
By: Wallenstein, Spangenberg, Hattis & Strampel
Attys.

United States Patent Office 3,441,948
Patented Apr. 29, 1969

3,441,948
RECORDER UTILIZING LUMINESCENT TRACE
Albert W. Ondis, North Kingstown, R.I., assignor to Techni-Rite Industrial Park, Warwick, R.I.
Continuation-in-part of applications Ser. No. 361,217, Apr. 20, 1964, and Ser. No. 614,297, Feb. 6, 1967. This application Sept. 29, 1967, Ser. No. 684,579
Int. Cl. G01d 15/10
U.S. Cl. 346—76    5 Claims

ABSTRACT OF THE DISCLOSURE

The recording apparatus utilizes, as a recording sheet, a laminate sheet having an outer, initially opaque layer adapted to be rendered locally transparent when impinged upon by a variable responsive moving stylus or localized beam of radiant energy, and an inner layer of luminescent material which becomes brilliantly luminescent when impinged upon by invisible radiant energy. A source of such invisible radiant energy is provided which continuously floods a relatively large area of the recording sheet acted upon by said stylus or localized beam of radiant energy to provide a readily visible trace where the outer layer of the recording sheet has been made transparent, to expose the inner luminescent layer thereof.

CROSS-REFERENCE

This application is a continuation-in-part of applicant's copending applications Ser. Nos. 361,217 filed Apr. 20, 1964, now abandoned, and 614,297, filed Feb. 6, 1967, now abandoned.

BACKGROUND OF THE INVENTION

This invention relates to the recording art and more particularly to the type of apparatus usually employed to permanently indicate and record changes, i.e., time variations of any physical, chemical or electrical phenomena of either high or low frequency that may be indicated by the oscillations of an electrical current.

It is old and well known in the art to record the time-variations of various phenomena and data by means of recording apparatus which transcribes on a moving sheet of recording material. The conventional electrocardiograph found in everyday use is one of the better-known devices of this general type. Other examples of apparatus of this type may be found in the fields of science and industry, and, specifically, such apparatus is used to record production data from production machinery, to measure pressure, temperature, voltage, electrical current, strains, vibrations, flow, etc.

Certain problems have been found to exist heretofore in oscillographic or galvanometric recorders of the general type above described. For example, in one type of recorder presently being used, the record has been made by radiating a beam of invisible light in the ultraviolet region of the light spectrum onto the surface of a form of photographic paper which is coated with an emulsion or some type of sensitizing agent. The beam of invisible radiation is oscillated by means of the galvanometer in response to variations in the phenomena being recorded. In the localized areas where the beam of invisible light contacts the surface of the paper, there is produced a latent impression which becomes a visible trace without any type of chemical processing. The disadvantages in this type of recording system first of all comprise the fact that a delay of from ten to thirty seconds occurs before the trace becomes visible. This delay is caused by the need for a progressive photographic change to take place in the recording paper, although it is possible to somewhat hasten this progressive photographic change by using a so-called latensifying lamp which applies heat and fluorescent light to the recording paper after the recording has taken place. However, whether or not a latensifying lamp is used, it has been found that the photographic change which takes places in the paper after a record has been made in order that the trace may become visible continues for so long as light is present and will eventually render the record very dark in color and hence substantially illegible unless suitable precautions are taken to chemically stabilize the paper or unless the recorder paper is promptly stored in total darkness where the above-mentioned progressive photographic change can no longer continue. A further disadvantage of this type of recording is that the recording paper may not be duplicated, or reproduced by the Diazo process, because this process relies on the passage through the paper of invisible radiations of the same type to which the paper is sensitive.

Another form of apparatus heretofore in use for recording the time-variations of phenomena are so-called ink-writing recorders. This type of apparatus employs a moving pen through which a suitable form of ink or other liquid flows, producing a record wherever the pen contacts the surface of the moving recording medium, which is usually paper. In this type of instrumentation, the pens are oscillated in response to variations in the phenomena being recorded, and it has been found that the pen is frequently affected by the gravitational and centrifugal forces generated as the pen oscillates. These forces will sometimes cause too much ink to flow, thus rendering the record illegible, or will completely prevent the flow of recording ink, thus producing no record whatsoever. Although attempts have been made to overcome this shortcoming by using pressurized ink, note U.S. Patent No. 3,054,109, the ink is still always subject to freezing, to changes in viscosity, to changes in the pressure balance brought about by atmospheric pressure changes, improper stylus contact, or by temperature changes or volumetric changes in the ink container. Thus, at best, this form of recording apparatus has limited use where extremes of environment are to be encountered such as in mobile applications, in airborne applications, or in unattended applications.

Another form of recording apparatus frequently in use, such as in the conventional electrocardiograph, is the so-called heat-writing recorder. In this type of recorder, the basic technique and operation employed once again involve a stylus that is oscillated in response to variations in the phenomena being recorded. The stylus is similar to the ink pen described above in that it contacts the recording material as the latter is being fed linearly through the apparatus. Unlike the inking pen, however, the stylus is dry but is heated by the passage of a suitable electrical current through the tip of the stylus, and hence the apparatus includes electrical transformers and other suitable means for controlling, altering, and maintaining the optimum stylus temperature. The recording material used in connection with these heat writing recorders is most usually paper, although other sheet material, such as cellophane, synthetic plastics and the like, may be utilized. However, no matter what the particular composition of the recording material may be, it is characterized by a dark undercoating, usually black, that is applied to the surface of the sheet in any suitable manner. An opaque outer coating, usually light in color, is transposed over the dark undercoating, said outer coating usually comprising a blushed lacquer film or the like. Examples of blushed outer coatings of this general type are shown and described in Kallock U.S. Patent No. 2,299,991; James U.S. Patent No. 2,519,660; Rosenthal U.S. Patent No. 2,739,909; Larson U.S. Patent No. 3,031,328; and Lawton U.S. Patent No. 3,090,697. All of these coatings have in common the fact that when engaged by a heated stylus, they become transparent at the point of engagement, thus rendering visible the dark undercoating at said point of engagement in order to form a visible trace. In most cases, the blushed opaque outer coating is thermally sensitive, whereupon engagement by a heated stylus results in the aforedescribed localized transparency. In some cases, however the opaque outer coating may be rendered transparent solely by pressure, in which case the stylus need not be heated. The aforementioned Rosenthal, Larson and Lawton patents are illustrative of thermal sensitive recording material, whereas the aforesaid Kallock and James patents are illustrative of pressure sensitive recording material.

Recording materials of the type described, whether heat sensitive or pressure sensitive, have proven to be highly effective in use since they eliminate the aforesaid problems that frequently arise where ink or other fluid is used to effect the recording, and, additionally, because recordings of this type are immediately visible and do not depend upon any latensification process. Also, the recordings are permanent and maintain their quality with the passage of time even though exposed to ordinary ambient conditions of light, temperature and humidity. There is, however, one very serious shortcoming in connection with heat and pressure recorders presently in existence. Reference is made to the fact that this type of recording apparatus is highly ineffective for recording data where the stylus is oscillating at a high rate of speed. The reasons for this in the case of thermal sensitive recording material appears to be that when the heated stylus is oscillating at a high rate of speed there is not sufficient time for the localized heating action to occur at any one point, and hence the transparent line becomes so fine that the contrasting undercoating can barely be seen, if at all. The same general result has been found to exist in connection with pressure sensitive recording materials, the reason here apparently being that, where the stylus is oscillating at high rates of speed, there is a tendency for the stylus to more or less skim over the recording material, whereby insufficient pressure engagement is made with the material to result in sufficient localized transparency for the contrasting undercoating to be clearly visible. Obviously, if lighting conditions are poor, as is frequently the case in industrial plants, for example, it becomes that much more difficult to see the trace.

Still another form of recording apparatus heretofore utilized includes an incandescent or mercury lamp producing both visible light, ultraviolet rays and preferably also infrared rays which are reflected from a mirror carried by a galvanomter movement onto a moving strip of recording material, the energy forming a narrow beam for tracing a pattern on the moving strip of recording material in accordance with the value of the variable measured by the galvanometer. The moving strip of recording material has an outer emulsion containing a phosphorescent and/or heat sensitive material. Before the strip of recording material is exposed to the narrow beam of both visible and invisible radiant energy, it is given a preexposure treatment by a radiant energy source Both an immediately visible and a permanent trace is provided on the strip of recording material, the immediately visible trace being caused by an afterglow or phosphorescence of the portion of the emulsion which was just impinged upon by the beam of radiant energy. The difficulty with this form of recording apparatus is that the afterglow is of progressively diminishing value so that the major portion of the trace which is desirably visible to the observer does not have an overall value of intensity which is desired for most satisfactory examination of the trace as it is being made. Also, there are many applications which make it desirable to utilize a more conventional type of recorder using a stylus which rides over the strip of recording material involved from the standpoint of the desired visibility of the moving recording element, economy and the type of record involved.

Summary

The present invention relates to recording apparatus that utilizes a strip of recording material which provides a trace which is readily visible over a relatively large viewing area, even when the stylus or other variable recording means is moving at a relatively high rate of speed over the strip of recording material. In carrying out of the above objective, the recording apparatus of the invention has a strip of recording material with an opaque outer layer or coating preferably of a heat and/or pressure sensitive material which is rendered locally transparent when it is impinged upon by a source of heat or pressure, and a layer or coating of a luminescent material immediately below the opaque layer, which luminescent material generates a relatively intense light of a color which substantially contrasts with the color of the opaque layer when invisible radiant energy is directed thereon. Built into the recording apparatus of the invention is a source of such invisible radiant energy, such as a so-called black-light source, that continuously floods with such invisible radiant energy a relatively large area of the strip of recording material which has just been recorded upon and which is visible to the operator of the recording apparatus. The recording means may desirably be a stylus or other means which produces a spot of heat or pressure on the outer opaque layer of the strip of recording material, which spot of heat or pressure moves in accordance with the value of the variable involved. As the points on the opaque layer of the recording material become transparent, the exposed portions of the luminescent coating struck by the invisible radiant energy luminesces brilliantly, and a large portion of the trace becomes readily visible to the operator.

Visible light excitable phosphorescent undercoatings overlaid with visible light opaque coatings have been heretofore used as negatives in the photomechanical reproduction of drawing sheets and the like. The opaque coatings of these negatives are mechanically scraped or cut away in accordance with the drawing to be reproduced. In such case, when a negative is to be reproduced, the exposed portions of the luminescent undercoating are momentarily subjected to natural or artificial light, and the negative is then immediately applied to printing sheets of photosensitive material to transfer the drawing involved the number of times onto the printing sheets. These negatives are, of course, of no utility whatsoever in recording apparatus of the type to which the present invention applies since the opaque coatings involved are not designed to be used as strips of recording material to be rendered transparent upon engagement by a recording stylus or the other recording means useful in such recording apparatus. Also, the manner in which these negatives are used is completely different from the manner in which the strip of recording material of the present invention is utilized in the recording apparatus just described.

Description of the invention

Figure 1:
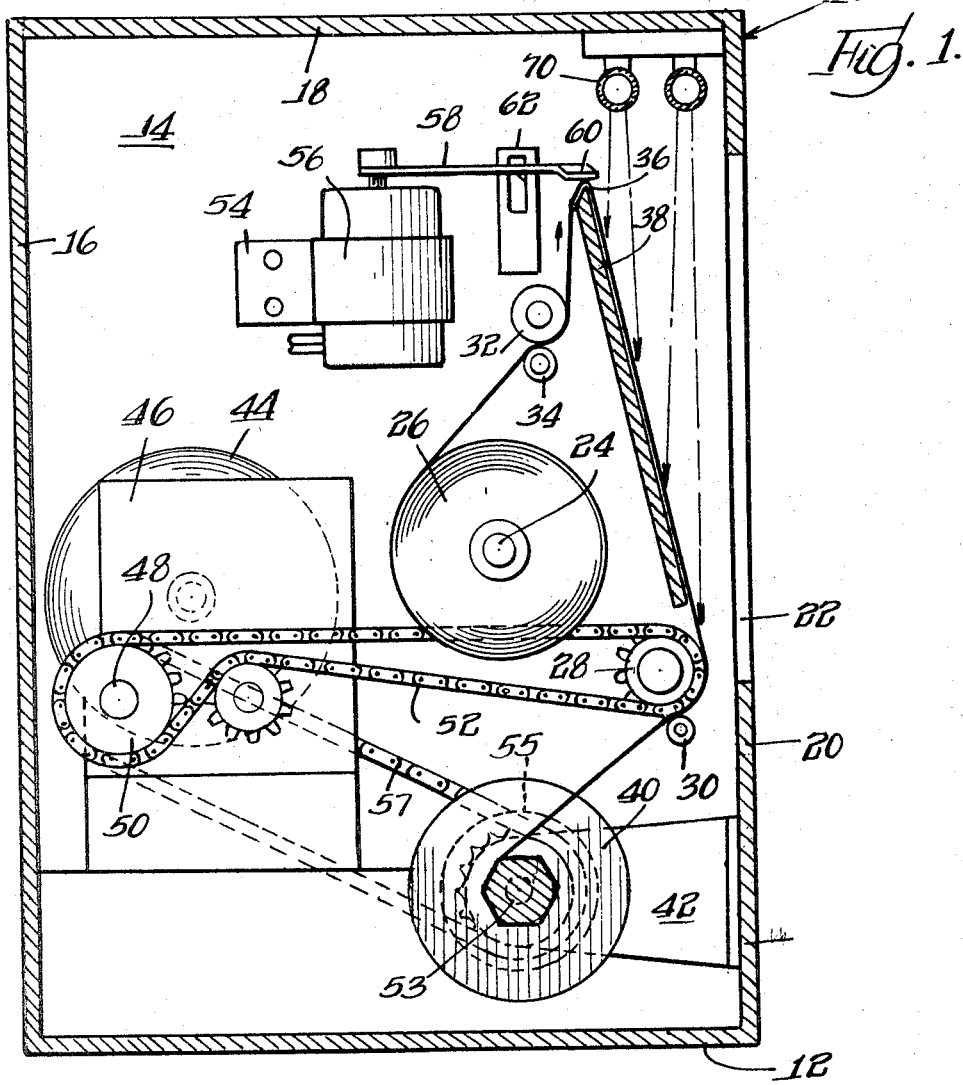
FIG. 1 is a side elevational view, partly in section, of a form of recording apparatus embodying the instant invention which utilizes a stylus as the recording means.

Referring now to the drawings, and more particularly to FIG. 1, there is shown a housing 10 having a base 12, side walls 14, rear wall 16 top wall 18 and front wall 20, the latter having an enlarged opening or window 22 therein. Within housing 10 there is mounted, as on shaft 24, a roll of recording material 26, the details of which will hereinafter be more fully described. The recording material 26 is preferably in elongated strip form and is continually dispensed or fed by means of drive rolls 28 and 30. More specifically, it will become apparent that when drive rolls 28 and 30 are driven in a clockwise and counterclockwise direction, respectively, the recording material 26 will be dispensed from its supply roll, which is freely mounted on shaft 24, the strip passing upwardly between tension clutch rollers 32, 34 and then upwardly over the top edge 36 of writing table 38 and then downwardly along the front surface of said writing table to its point of engagement between drive rollers 28 and 30. From the drive rollers 28 and 30 the recording material passes to a rewind or take-up roll 40 on bracket 42, said bracket being secured to housing 10 by any suitable means.

The rolls 28, 30 and 40 are driven by a motor 44 which is connected to a transmission unit 46 having therein suitable gears for imparting the desired speed to shaft 48 which drives roller 50 that in turn is drivingly interconnected with roller 28, as by sprocket chain 52 or the like. The shaft 48 also drives a shaft 53 carrying the take-up roll 40 through a slip clutch 55 and chain 57.

Also mounted in housing 10, by any suitable means, such as bracket 54, is a galvanometer 56 which operates in a conventional fashion to cause movement of stylus 58, the writing tip 60 of which is in engagement with the recording material 26 at the top edge 36 of writing table 38. More specifically, variations in current caused by the changes in the phenomena being recorded cause deflection of of the galvanometer coil, which deflection is translated through stylus 58 to record a trace on the continuously moving recording material 26. A conventional stylus lifting device 62 is mounted in housing 10 for lifting the stylus to inoperative position when desired. The stylus 58 may be either the heat or pressure type, and it will be understood that, if the stylus 58 is of the heat writing variety, suitable and conventional electrical apparatus (not shown) is provided to cause the proper heating of the stylus. It has also been found, particularly when the recorder is of the heat writing variety, that positioning of the stylus so that it makes approximately a 90° angle with the direction of the recording material as the latter approaches the writing table provides more effective recording. In this connection, it will be noted that the tension clutch rollers 32 and 34 not only keep the recording material under tension, but also control the angle at which the material approaches the writing edge.

Figure 2:
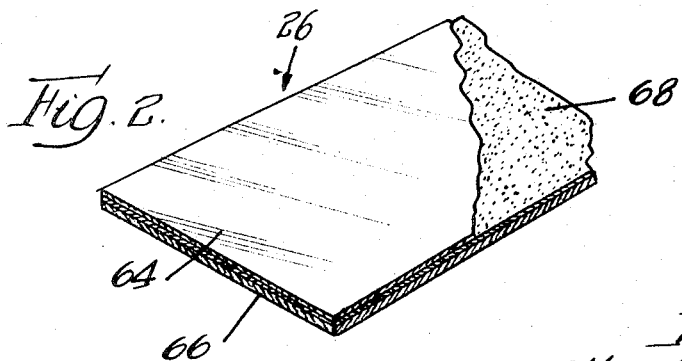
FIG. 2 is a sectional perspective view of the recording material per se that forms a part of my invention.

The strip of recording material 26, shown specifically in FIG. 2, is generally of the type shown and described in the aforementioned Kallock, James, Rosenthal, Larson and Lawton patents in that there is provided an opaque outer coating 64 that is a blushed film, adapted to be rendered locally transparent by application thereto of either heat or pressure, transmitted by means of stylus 58. However, the base 66 of the strip 26, instead of being coated with a light-absorbing dark color, as is the conventional practice, is covered with a luminescent, most advantageously a fluorescent, coating 68, the color of which substantially contrasts with the color of outer coating 64. The base 66 may be of any flexible material, such as paper, or the like. When the opaque coating is a white blushed film, the fluorescent coating is most preferably a green fluorescent coating. This coating may be, for example, a green fluorescent printing ink of the type manufactured and sold by the Radiant Color Company, 461 W. Erie St., Chicago, Ill. An orange fluorescent coating is also useful with a white blushed coating, but is much less desirable than the green fluorescent coating because it was found difficult to mask completely the orange fluorescent coating with the white blushed coating. The orange coating gave the blushed coating a pink hue which reduced the contrast between the blushed and orange coatings.

It has been found that use of the aforedescribed recording material 26, characterized by the fluorescent undercoating 68, results in a readily visible trace, even where the stylus 58 oscillates at relatively high speeds when the recording material is flooded with an invisible radiant energy which activates the fluorescent coating. Thus, whereas the extremely fine traces made by a fast moving stylus are virtually illegible to the naked eye when a conventional plain black undercoating is used, the trace becomes readily visible where the fluorescent undercoating is used and activated as explained.

The housing 10 is provided with an invisible radiant energy source capable of activating the luminescent phosphors of the undercoating 68. This source of energy preferably takes the form of one or more ultraviolet light emitting or black light lamps 70 mounted in the housing 10 by any suitable means so as to be located above the front surface of writing table 38. More specifically, as will be clearly seen in FIG. 1, the writing table 38 is preferably inclined from top to bottom toward the window 22, thus making it possible for the black light lamps 70 to be located above the front surface of the strip of recording material 26 as it passes over the forward surface of writing table 38. This arrangement results in maximum exposure of the recording material 26 to the black light after the recording has taken place, it being obvious that the recorded data may also be readily viewed through the window 22 by an observer located at the front of housing 10. Specifically, it has been found that the black light lamps, for best results, should emit light in the spectrum of 3200 to 4000 angstrom units and should engage the surface of the recording material with an intensity of approximately 10 foot-lamberts. Although the light so emitted by lamps 70 is in the shorter wave lengths of the spectrum so as to be practically invisible, upon impingement thereof with the fluorescent undercoating exposed by the stylus 58, the electrons in the pigmentation of the latter is caused to resonate in the visible region of the light spectrum in such a way as to produce a brilliant and highly contrasting trace which is readily visible even under relatively high intensity room lighting conditions. Because a large area of the strip of recording material affected by the stylus is flooded by the invisible lights from the lamps 70, the observer sees a large section of the trace made by the stylus. Since the lamp 70 is a black light source emitting little or no visible light, there is no light resulting from the lamp 70 reflected or transmitted to the observer from those portions of the blushed coating 64 not engaged by the stylus which factor produces maximum contrast between the exposed luminescing portions of the undercoating 68 and the blushed coating 64.

A conventional, commercially available recording material of the thermal or pressure sensitive type having a black undercoating and a blush opaque outer coating was introduced into conventional recording apparatus and was caused to move linearly therethrough at a fixed speed of approximately 25 mm./sec. The recording stylus, which was of the heat writing variety, was attached to a galvanometer and was brought into contact with the surface of the recording material, and, by means of a rheostat, the current flow through the stylus was adjusted until the stylus temperature was elevated to a point sufficient to cause a localized heating action. As the paper moved linearly, a trace was produced in the form of a continuous black line. Then, by means of a signal generator, a varying signal was applied to the galvanometer to which the stylus was attached. As the varying signal moved the D'Arsonval movement in the galvanometer, this caused a similar movement of the stylus. By adjusting the frequency and strength of the signal, it was possible to continuously vary the oscillation rate of the stylus. By increasing the oscillation rate of the stylus, the rate of stylus speed with respect to the material moving beneath it was accordingly increased, and this, in turn, reduced the duration of time that the stylus was in contact with the surface of the recording material at any one point. As the stylus oscillation rate was increased, a gradual lessening in the intensity of the recorded line or trace began to take place. By adjusting the rheostat to increase the stylus temperature, it was possible to make the recorded line or trace more visible. However, when the maximum practical adjustment of stylus temperature had been reached and the oscillation rates of the stylus continued to increase, the contrasting black line or trace continued to decrease in intensity until finally the trace was no longer visible to the naked eye although the stylus continued to be heated and continued to be in contact with the surface of the moving recording material.

The exact same test as above described was then repeated in the apparatus of the instant invention, i.e., wherein the recording material was characterized by a luminescent undercoating and wherein the apparatus had a black light lamp mounted therein which emitted light in the spectral region of 3200 to 4000 angstrom units and which engaged the surface of the recording material with an intensity of approximately 10 foot-lamberts. It was found that under the exact same conditions of stylus heat and oscillation, the trace was readily visible, whereas, as above indicated, under the same conditions where conventional recording apparatus and material was used, the trace was not visible to the naked eye.

Figure 3:
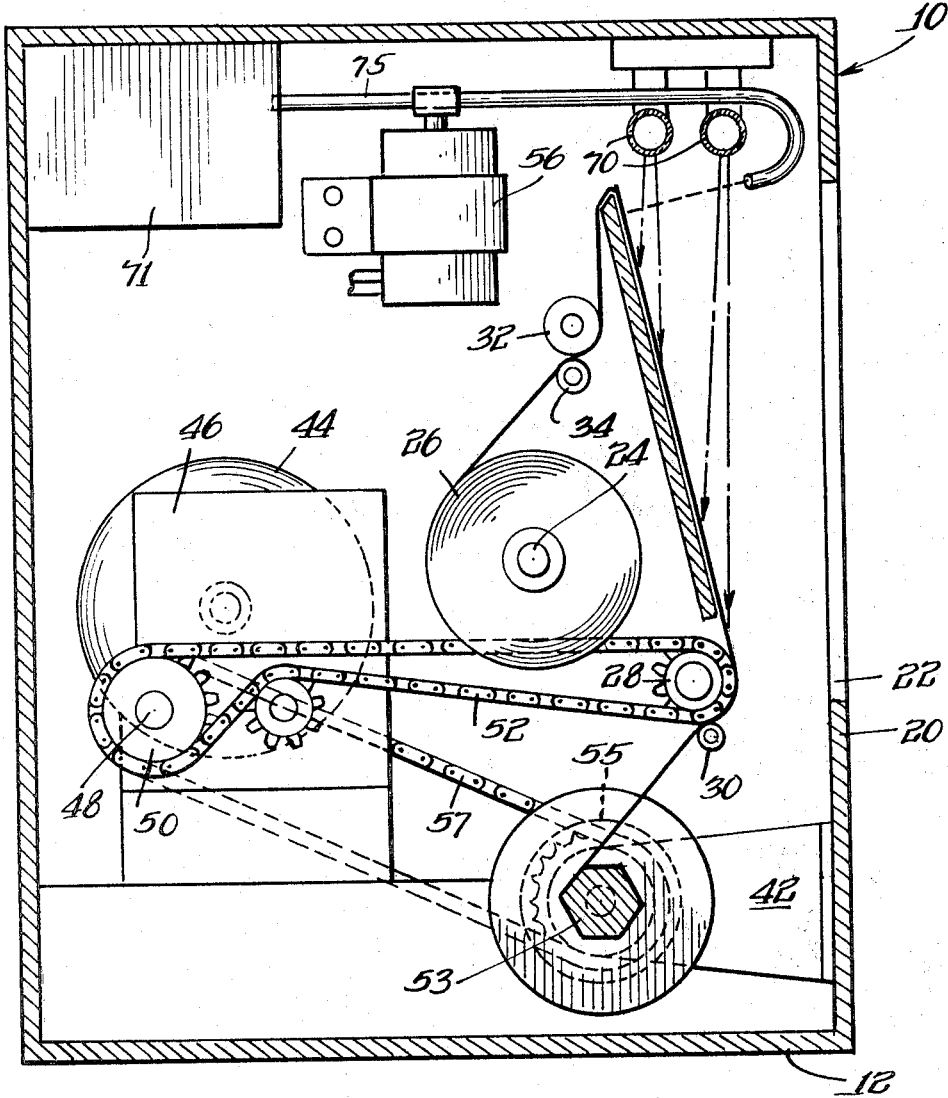
FIG. 3 illustrates a modified form of the invention utilizing a laser beam as the recording means.

Higher speed of operation of the recording apparatus of the invention can be achieved if the stylus 58 is replaced by a very concentrated beam of heat such as that produced by a laser unit. Refer now to FIG. 3 which illustrates this form of the invention which is similar in most respects to the recording apparatus shown in FIG. 1, similar reference numbers being utilized for corresponding parts. As shown in FIG. 3, a laser unit 71 is energized to produce a laser beam directed into a laser beam conduit 75, which may be constituted by a body of strands of glass or plastic material. The conduit 75 is carried by the movable shaft of the galvanometer 56. The laser beam conduit directs the laser beam onto the strip of recording material flooded by the black light lamp 70. The laser unit 71, which may include a crystal, such as a ruby, or a gas, takes energy in the form of light and makes the radiations parallel (or coherent) rather than diffused. The energy thus concentrated is adjusted in intensity to heat or burn through the opaque coating 64 to render the same locally transparent without harming the luminescent undercoating 68, thereby exposing the luminescent undercoating which is excited by the lamps 70.

I claim:

1. In a recording apparatus adapted to display a visible trace representing the variation in the value of a variable with time and including a movable recording means which moves in accordance with the variation in the value of the variable involved, a laminate recording sheet which is positioned in relationship to said recording means to be acted on thereby, said recording sheet having an outer layer of opaque material which does not reflect or transmit visible light when invisible radiant energy is directed thereon and which is rendered locally transparent where said recording means acts thereon, said recording means being instantaneously directed upon only a small localized area or point of said opaque outer layer of said recording sheet and moving over various portions of said opaque layer in accordance with the value of the variable involved, said recording sheet having an inner layer of luminescent material immediately beneath said outer opaque layer and which becomes brilliantly luminescent in a color which substantially contrasts with the color of said outer opaque layer when said invisible beam of radiant energy impinges thereon, and a source of said invisible radiant energy whoch floods a relatively large portion of said recording sheet acted upon by said recording means so as to cover an area of said recording sheet with said invisible radiant energy which encompasses an appreciable portion of the path of travel of said recording means thereon, wherein an appreciable extent of the recording sheet rendered transparent by said recording means displays brilliantly luminescing areas of said recording sheet flooded by said invisible radiant energy to the operator of the recording apparatus.

2. The recording apparatus of claim 1 wherein said luminescent inner layer is a greenish luminiescent fluorescent material and said outer opaque layer is whitish in color.

3. The recording apparatus of claim 1 wherein said recording means is a stylus which engages the outer opaque layer of said recording sheet which is rendered locally transparent where slidably engaged by the stylus.

4. The recording apparatus of claim 1 wherein said recording means is a narrow beam of radiant energy and said outer opaque layer is rendered locally transparent at the points thereof impinged upon by said narrow beam of radiant energy.

5. The recording apparatus of claim 1 wherein said recording apparatus has a housing for said recording sheet, recording means and source of invisible radiation, said housing having a viewing window within which the relatively large portion of said recording sheet flooded by said invisible radiation is visible through said window.

References Cited

UNITED STATES PATENTS

| | | | |
|---|---|---|---|
| 2,321,046 | 6/1943 | Rudnick | 117—36.7 X |
| 2,407,596 | 9/1946 | Wirshing et al. | 250—71 X |
| 2,454,966 | 11/1948 | Faus | 346—76 X |
| 2,554,017 | 5/1951 | Dalton | 346—135 X |
| 2,739,909 | 3/1956 | Rosenthal | 117—161 |
| 3,104,929 | 9/1963 | Daigler | 346—136 X |
| 3,226,696 | 12/1965 | Dove | 340—173 |
| 3,334,354 | 8/1967 | Everest | 346—76 |

RICHARD B. WILKINSON, *Primary Examiner.*

J. W. HARTARY, *Assistant Examiner.*

U.S. Cl. X.R.

117—36.7; 250—72; 346—135